United States Patent Office 3,035,054
Patented May 15, 1962

3,035,054
POTASSIUM DICHLOROISOCYANURATE PROCESS
William F. Symes, Webster Groves, and Nicholas S. Hadzekyriakides, Clayton, Mo., assignors to Monsanto Chemical Company, St. Louis, Mo., a corporation of Delaware
No Drawing. Filed May 22, 1959, Ser. No. 814,945
8 Claims. (Cl. 260—248)

This invention relates to a continuous process for making potassium dichloroisocyanurate from potassium hydroxide and dichloroisocyanuric acid in an aqueous medium.

Anhydrous potassium dichloroisocyanurate sometimes termed potassium dichlorocyanurate which can be represented structurally as follows:

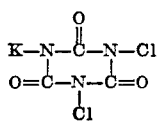

recently has been found to be a highly useful source of available chlorine in solid bleach and detergent formulations. In view of such finding, methods have been sought to produce it economically, efficiently and safely.

In accordance with this invention, there is provided a continuous process for making potassium dichloroisocyanurate in an economic manner whereby quantitative or substantially quantitative yields are obtained safely. The process essentially comprises bringing together and reacting dichloroisocyanuric acid and potassium hydroxide in an aqueous medium in a reaction zone at a temperature in the range of about 0° C. to about 65° C., the rate of addition and mixing of said reactants being such as to maintain a pH in the range of about 5.5 to about 7.5, thereby forming an aqueous reaction mixture having a pH in the range of about 5.5 to about 7.5 comprising a slurry of the solid reaction product of the said reactants, continuously removing a portion of said aqueous reaction mixture from said reaction zone, separating the solids from the bulk of the aqueous phase of the said removed aqueous reaction mixture and dewatering the solids so obtained. By "dewatering" is meant any drying procedure which removes water either combined or uncombined and provides potassium dichloroisocyanurate containing less than 2% by weight of water.

In the process of this invention, the potassium hydroxide reactant is employed in the form of an aqueous solution thereof, preferably one containing about 10 to about 90 parts by weight of potassium hydroxide per 100 parts by weight of water.

With respect to the dichloroisocyanuric acid reactant, it can be used in solid form or in the form of a water wet solid or as an aqueous solution or slurry thereof, the form being determined by the amount of water added as aqueous potassium hydroxide and the manner of mixing said reagents, that is, whether the reactants are to be directly mixed or whether said dichloroisocyanuric acid and said aqueous potassium hydroxide are to be added to a heel such as water or an aqueous solution or slurry of the solid reaction product of said reagents. It is preferred however, that the dichloroisocyanuric acid be added in the form of a water wet solid, that is, a mixture of water and dichloroisocyanuric acid wherein the latter predominates on a weight basis, e.g., a water wet mix containing on a weight basis from about 50% to about 85% dicsloroisocyanuric acid and from about 50% to about 15% water.

In general, the bringing together of potassium hydroxide and dichloroisocyanuric acid in an aqueous medium should be so controlled that the total solids content in the reaction mixture at any one time does not exceed 50%, that is to say, in the reaction zone the water content should not be less than 50% of the total mass therein, otherwise the contents in the reaction zone present an agitation and handling problem.

It is necessary that the rate of addition of the respective reagents and mixing of same in the reaction zone be such that a pH in the range of 5.5 to 7.5 be maintained, otherwise the yields of potassium dichloroisocyanurate will not be quantitative or substantially quantitative. Furthermore, employing a pH above 7.5, decomposition products such as nitrogen trichloride form in highly hazardous amounts, while employing a pH below 5.5 results in the presence in the final product of a substantial amount of unreacted dichloroisocyanuric acid which is relatively unstable in storage and in use yielding a highly undesirable odor. The maintaining of the pH in the range of 5.5 to 7.5 realizes no substantial excess of either reactant of the process of this invention. It is particularly preferred, however, that the pH be maintained in the range of from about 6.0 to about 7.0.

Although reaction temperatures in the range of about 0° C. to about 65° C. can be employed, it is preferred that a reaction temperature in the range of about 15° C. to 50° C. be employed. It is particularly preferred to use a temperature in the range of from about 20° C. to about 40° C. Depending upon the reaction temperature employed in the process of this invention, anhydrous potassium dichloroisocyanurate can be ultimately recovered in one of two different physical forms or mixtures thereof. For purposes of this invention, one anhydrous form will be called Form I and the other anhydrous form will be called Form II. Form I potassium dichloroisocyanurate is a white crystalline solid whose internal and external symmetry is monoclinic. Form II potassium dichloroisocyanurate is a white crystalline solid whose internal symmetry is monoclinic but whose external symmetry is triclinic. These anhydrous forms have the same X-ray diffraction pattern and both decompose without melting at above about 230° C. They cannot be transformed into one another by heat treatment or exposure to surface moisture. When dichloroisocyanuric acid is reacted with potassium hydroxide in accordance with the process of this invention at a temperature above about 56° C. anhydrous Form I separates from the reaction mass. However when dichloroisocyanuric acid is reacted with potassium hydroxide according to the process of this invention at a reaction temperature below about 52° C. the solid which precipitates is potassium dichloroisocyanurate monohydrate, which monohydrate on losing its water of hydration gives Form II potassium dichloroisocyanurate. When reaction temperatures in the range of about 52° C. to 56° C. are employed, the separated solids are a mixture of Form I potassium dichloroisocyanurate and potassium dichloroisocyanurate monohydrate, which mass on drying to remove the water provides a mixture of the respective anhydrous forms, that is, a mixture of Form I and Form II. With respect to the monohydrate of potassium dichloroisocyanurate which separates from a reaction mass obtained upon reacting potassium hydroxide and dichloroisocyanuric acid at temperature below about 52° C., this product is a white crystalline solid whose internal and external symmetry is triclinic and whose X-ray diffraction pattern is distinct from either that of Form I or Form II potassium dichloroisocyanurate the X-ray patterns of which as aforenoted being the same. This monohydrate of potassium dichloroisocyanurate upon losing its water of hydration yields Form II potassium dichloroisocyanurate. However, the dehydrated crystal maintains the same size and shape of the parent monohydrate. In other words, Form II potassium dichloroisocyanurate is the pseudomorph of the monohydrate of potassium dichloroisocyanurate.

As aforenoted the dichloroisocyanuric acid and the potassium hydroxide reactants are continuously brought together in an aqueous medium at such a rate and with sufficient agitation to maintain a pH in the range of 5.5 to 7.5 but preferably from about 6.0 to about 7.0. Any means of agitation which provides an intimate and uniform contacting of the respective reagents can be employed. It is particularly preferred that the reaction zone to which the respective agents are added be initially charged with an aqueous heel, which may be water per se or an aqueous solution of potassium dichloroisocyanurate. A particularly useful heel is the mother liquor (e.g. the centrifuge effluent) of a previously conducted reaction wherein dichloroisocyanuric acid and potassium hydroxide are reacted in accordance with the process of this invention.

The solid reaction product, that is Form I or potassium dichloroisocyanurate monohydrate or mixtures thereof, formed in the aqueous reaction mixture is preferably continuously removed from the reaction zone together with a portion of the aqueous medium, and preferably so as to maintain the volume of the aqueous reaction mixture in the reaction zone substantially constant. The solids are then separated from the bulk of the aqueous phase with which they are associated in the reaction mixture by any of the well known means for mechanically separating solids from liquids such as filtration, decantation, centrifugation and the like. The wet solid product is then dewatered or dried to form a substantially dry (i.e., one containing less than 2 percent moisture) or bone dry product. In that the solid reaction product, that is Form I or potassium dichloroisocyanurate monohydrate or mixtures thereof, is moderately soluble in water (about 8.5 parts by weight per 100 parts by weight of water 25° C.) in order to obtain increased yields and improve the efficiency of the process, it is preferred that the aqueous reaction mixture comprising the desired solid reaction product be withdrawn from the reaction zone and suitably cooled and thereafter separate the solids from the bulk of the aqueous phase. Alternatively or in conjunction with the desired cooling operation, the separated aqueous phase which will have a small amount of dissolved potassium dichloroisocyanurate and a pH in the range of 5.5 to 7.5 can be recycled to the reaction zone. When so operating it is preferred that the removed aqueous phase prior to recycling be subjected to vacuum concentration at a suitable temperature, as for example, in the range of about 25° C. to about 50° C. whereby a substantial amount of the water, e.g., up to about 75% by weight, is removed.

The sojourn time of an increment of potassium hydroxide and an increment of dichloroisocyanuric acid required to produce an increment of the desired solid reaction product in the reaction zone is usually less than 5 minutes and in most instances the reaction is substantially instantaneous.

As illustrative of the process of this invention but not limitative thereof is the following:

*Example I*

To a suitable reaction vessel equipped with a thermometer, agitator, an off-gas tube, and an ice-bath for controlling the reaction temperature is charged an aqueous solution of potassium dichloroisocyanurate containing approximately 20 parts by weight of potassium dichloroisocyanurate and 200 parts by weight of water which solution has a pH of 5.7. Thereto is added with constant agitation 56 parts by weight of potassium hydroxide in the form of a 45% by weight aqueous solution thereof and 198 parts by weight of dichloroisocyanuric acid in the form of a 77% by weight water wet solid (i.e., wet solid containing 23% by weight water) respectively at such a rate so as to maintain the pH in the range of 5.6 to 5.8. Throughout the addition of the respective reagents the temperature of the reaction mixture is maintained in the range of 28° C. to 32° C. A substantially constant volume is maintained in the reaction zone by removing a portion of the solid reaction product together with the aqueous phase of the slurry periodically by means of a suction pump into a suitable receiver wherein the slurry is cooled to 25° C. and centrifuged. The centrifuge cake which contains 2% moisture and potassium dichloroisocyanurate in the form of a monohydrate (i.e., this monohydrate contains 7% by weight water of hydration) is then dried at 100° C. to remove all of the water (both combined and uncombined) yielding crystalline Form II potassium dichloroisocyanurate. The mother liquor (which has a pH in the range of 5.6 to 5.8) is then concentrated under vacuum at 40° C. so as to remove substantially 50% of the water and the concentrated solution returned to the reaction zone so as to maintain the water balance for a 40% solids content in the reaction zone. The average sojourn time in the reactor and cooling receptacle is one hour. The dried white crystalline product is substantially pure Form II potassium dichloroisocyanurate (i.e. contains more than 98% $KC_3N_3O_3Cl_2$ as Form II) and has an available chlorine content of 59.8% or 99.4% of theory and based on the potassium hydroxide charged the yield is 100%. The size and shape of this anhydrous product is the same as that of its precursor, i.e. potassium dichloroisocyanurate monohydrate.

*Example II*

To a suitable reaction vessel equipped with a thermometer, agitator, an off-gas tube, and a water bath for controlling the reaction temperature is charged 250 parts by weight of water. Thereto is added with constant agitation 56 parts by weight of potassium hydroxide in the form of a 45% by weight aqueous solution thereof and 198 parts by weight of dichloroisocyanuric acid in the form of a 77% by weight water wet solid (i.e., a wet solid containing 23% by weight water) respectively at such a rate so as to maintain the pH in the range of 5.6 to 5.8. Throughout the addition of the respective reagents the temperature of the reaction mixture is maintained in the range of 60° C. to 64° C. while bubbling air through the reaction mass to assist in the rapid removal of any possible gaseous decomposition products. A substantially constant volume is maintained in the reaction zone by removing a portion of the solid reaction product together with the aqueous phase of the slurry periodically by means of a suction pump into a suitable receiver wherein the slurry is maintained at 58–60° C. and centrifuged. The centrifuge cake which contains about 10% moisture and potassium dichloroisocyanurate (i.e., Form I) is then dried at 100° C. to remove all of the water yielding Form I potassium dichloroisocyanurate as flat plate crystals. The mother liquor (which has a pH in the range of 5.6 to 5.8) is then concentrated under vacuum at 60° C. so as to remove substantially 45% of the water and the concentrated solution returned to the reaction zone so as to maintain the water balance for a 35% solids content in the reaction zone. The average sojourn time in the reaction zone and cooling receptacle is one hour. The dried flat plate product is substantially pure Form I potassium dichloroisocyanurate and has a substantially theoretical available chlorine content and based on the potassium hydroxide charged the yield is substantially 100%.

*Example III*

To a suitable reaction vessel equipped with a thermometer, agitator, an off-gas tube, and a water bath for controlling the reaction temperature is charged 250 parts by weight of water. Thereto is added with constant agitation 56 parts by weight of potassium hydroxide in the form of a 45% by weight aqueous solution thereof and 198 parts by weight of dichloroisocyanuric acid in the form of a 50% by weight water wet solid (i.e., a wet solid containing 50% by weight water) respectively, at such a rate so as to maintain the pH in the range of 5.7 to 6.1. Throughout the addition of the respective reagents the temperature of the reaction mixture is maintained in the range of 60° C. to 64° C. while bubbling air through the reaction mass to assist in the rapid removal of any possible gaseous decomposition products. A substantially constant volume is maintained in the reaction zone by removing a portion of the solid reaction product together with the aqueous phase of the slurry periodically by means of a suction pump into a suitable receiver wherein the slurry is cooled to 15° C. and centrifuged. The centrifuge cake which contains about 10% water and potassium dichloroisocyanurate (i.e., Form I and a smaller amount of potassium dichloroisocyanurate monohydrate) is then dried at 100° C. to remove all of the water yielding Form I potassium dichloroisocyanurate flat plats in admixture with a small amount of Form II crystals. The mother liquor (which has a pH of approximately 6.0) is then concentrated under vacuum at 40° C. so as to remove substantially 45% of the water and the concentrated solution returned to the reaction zone so as to maintain the water balance for a 35% solids content in the reaction zone. The average sojourn time in the reaction and cooling receptacle is one hour. The dried crystalline product is substantially pure potassium dichloroisocyanurate as a mixture of Form I and Form II and has a substantially theoretical available chlorine content and based on the potassium hydroxide charged the yield is substantially 100%.

In contrast to the foregoing, when aqueous potassium hydroxide is added to a reaction vessel initially charged with dichloroisocyanuric acid in admixture with water, or vice versa, without controlling the pH and/or the reaction temperature explosive conditions develop due to the decomposition of the dichloroisocyanuric acid.

With respect to the dewatering operation to provide Form I or Form II or mixture thereof, any drying temperature less than about 200° C. can be used which provides an anhydrous or substantially anhydrous product, i.e., one containing less than 2% water. It is preferred to use a drying temperature of 100 to 110° C.

As aforesetforth depending upon the reaction temperature either Form I or Form II potassium dichloroisocyanurate or mixture thereof can be ultimately obtained and such temperature limitations also apply in recovering potassium dichloroisocyanurate from solutions thereof. That is to say when a solution of potassium dichloroisocyanurate is cooled to or vacuum concentrated at a temperature below about 52. C. the precipitate obtained is potassium dichloroisocyanurate monohydrate, whereas Form I potassium dichloroisocyanurate is that which precipitates when a solution of potassium dichloroisocyanurate is cooled to to or vacuum concentrated at a temperature above about 56° C. It has been observed that crystals of potassium dichloroisocyanurate monohydrate obtained upon very slowly cooling a solution of potassium dichloroisocyanurate to a temperature below about 52° C. have a tendency to grow in size while crystals of Form I potassium dichloroisocyanurate do not display this tendency to grow in size on precipitating from a solution of potassium dichloroisocyanurate upon very slowly cooling same. While potassium dichloroisocyanurate of any particle size in either crystalline form or mixtures thereof is characterized by outstanding stability, particularly in bleach and detergent formulations containing same (such as those described in co-pending application Serial Number 693,816, filed November 1, 1957, and co-pending application Serial Number 802,025, filed March 26, 1959, both to E. A. Casey and R. L. Liss, both applications assigned to the same assignee as this invention, the subject matter of which being incorporated herein by reference in order to avoid unnecessary enlargement of this specification), a factor in its optimum stability characteristics is its particle size. It has been observed that coarse (or large) particles (i.e. particles which are retained on a 100 U.S. mesh screen) are more stable in detergent formulations, particularly those containing a non-ionic surface active agent, than fine (or small) particles (i.e. particles which pass through a 170 U.S. mesh screen) where both the coarse and fine particles are of the same crystalline habit. Of the two crystalline forms of anhydrous potassium dichloroisocyanurate, it has been observed as aforementioned that crystals of the monohydrate of potassium dichloroisocyanurate exhibit a tendency to grow and therefore crystals of its pseudomorph, i.e. Form II potassium dichloroisocyanurate are obtainable in much coarser (or larger) particle size than crystals of Form I. These coarse particles constitute another aspect of this invention, a means or process of obtaining same comprising passing a supersaturated solution of potassium dichloroisocyanurate into an aqueous slurry of potassium dichloroisocyanurate monohydrate in a crystallizing vessel wherein the temperature of the slurry is not greater than the temperature of the added supersaturated solution, neither temperature of course exceeding about 52° C. As the supersaturated solution enters the vessel, it begins to discharge its supersaturation on the slurry particles causing them to grow. As the crystals or particles grow or become larger they settle to lower levels of the vessel while the fine (or small) particles rise to the upper levels of the vessel. Constant level can be maintained in the vessel by discharging the wet coarse solids from the bottom of the vessel while removing liquor (which may be a slurry of relatively small particles of potassium dichloroisocyanurate monohydrate or solution of potassium dichloroisocyanurate depending upon the temperature, rate of feeding of the supersaturated solution, and the like) from the top of the vessel, which latter can be used to prepare a super-saturated solution of potassium dichloroisocyanurate which can be thereafter recycled to the aqueous slurry in the crystallizer vessel. The wet solids discharged from the bottom are potassium dichloroisocyanurate monohydrate crystals which upon drying at about 100° C. provide Form II potassium dichloroisocyanurate having a coarse particle size. It is preferred that the super-saturated solution of potassium dichloroisocyanurate contain not more than one percent supersaturation.

To illustrate this aspect of this invention is the following:

Example IV

To a conical shaped crystallizing vessel having a discharging element at the bottom thereof, a feed tube near the bottom of the vessel which is connected at its other end to a mixer, and a liquid take off tube positioned at the top of the vessel, is charged a 25° C. saturated aqueous solution of potassium dichloroisocyanurate. While maintaining the contents of the vessel at 25° C. there is pumped continuously into the crystallizing vessel through the feed tube a 25° C. super-saturated solution of potassium dichloroisocyanurate containing approximately 0.9 gram of supersaturation per 100 grams of solution. Nuclei of potassium dichloroisocyanurate monohydrate crystals begin to form at a point a short distance from the point of entry of the supersaturated solution into the vessel, which nuclei begin to grow regularly forming a slurry as more of the super-saturated solution is admitted to and disperses in the vessel. The volume of the vessel is maintained at about 3600 cc. by withdrawing liquor from the top of the vessel at the rate of 900 cc./min., which liquor contains 10.6% potassium dichloroisocyanurate. This liquor is continually conveyed to a mixer and mixed with a 25% by weight aqueous slurry of Form II potassium dichloroisocyanurate which is fed to the mixer at the rate of 60 grams per minute. The mass in the mixer is continually kept at 30° C. to solubilize all the potassium dichloroisocyanurate. This solution is then continually conveyed to a cooler which rapidly reduces the temperature of the solution to 25° C. producing the above described supersaturated solution which is continuously fed into the crystallizing vessel through the feed tube as above described. The coarse solids which settle to the bottom of the crystallizing vessel are periodically discharged therefrom and dried at about 110° C. in an air circulating oven to remove all of the water both combined and uncombined. This dried product consists of particles of anhydrous Form II potassium dichloroisocyanurate which upon screening a six pound sample thereof showed that substantially 100% passed through a 20 U.S. mesh screen and that 93% of the particles were retained on a 100 U.S. mesh screen (by 20 U.S. mesh screen is meant a screen having 20 holes per linear inch and by 100 U.S. mesh screen is meant a screen having 100 holes per linear inch).

To illustrate the stability of anhydrous Form II potassium dichloroisocyanurate of various particle sizes with respect to non-ionic surface active agents, formulations were prepared containing 96% by weight of silica, 2% by weight of the condensation product of one molecular proportion of oxo-tridecyl alcohol with about 9 molecular proportions of ethylene oxide, and 2% by weight of anhydrous Form II potassium dichloroisocyanurate of various particle sizes listed below. Duplicate samples of these formulations were placed in sealed glass jars and stored at 60° C. for 17 hours and 66 hours, respectively. The amount of decomposition or loss of available chlorine at the end of 17 hours and 66 hours averaged as follows:

| Particle size [1] (U.S. mesh screen) | Loss [2] in available chlorine after— | |
|---|---|---|
| | 17 hours | 66 hours |
| | Percent | Percent |
| −50, +60 | 17.0 | 26.0 |
| −80, +100 | 18.0 | 31.0 |
| −170, +200 | 26.0 | 50.0 |
| −200 | 33.0 | 66.0 |

[1] (− means the particles of Form II potassium dichloroisocyanurate pass through the screeen while + means the particles of Form II potassium dichloroisocyanurate are retained on the screen, for example "−50, +60" means the particles pass through a screen having 50 holes per linear inch but are retained on a screen having 60 holes per linear inch.)
[2] (Loss in available chlorine means the loss in percent of the total of available chlorine initially present in Form II potassium dichloroisocyanurate when mixed with the silica and non-ionic surfactant. In all instances the initial amount of available chlorine was the same.)

While this invention has been described with respect to certain embodiments it is to be understood that it is not so limited and it is to be further understood that variations and modifications thereof obvious to those skilled in the art may be made without departing from the spirit or scope of this invention.

This application is a continuation-in-part of application Serial Number 754,125, filed August 11, 1958, now abandoned.

What is claimed is:

1. The process of making potassium dichloroisocyanurate which comprises continuously bringing together and reacting potassium hydroxide and dichloroisocyanuric acid in an aqueous medium in a reaction zone maintained at a temperature in the range of about 0° C. to about 65° C., the rate of addition and of mixing said reactants being such as to maintain a pH in the range of 5.5 to 7.5, thereby forming an aqueous reaction mixture in said reaction zone having a pH in the said range comprising an aqueous slurry of the solid reaction product of said reactants, continuously removing a portion of said aqueous reaction mixture from said reaction zone, separating the solids from the bulk of the aqueous phase of the said removed aqueous reaction mixture, and dewatering the separated solids.

2. The process of making crystalline potassium dichloroisocyanurate having a monoclinic internal symmetry and a triclinic external symmetry which comprises continuously bringing together and reacting potassium hydroxide and dichloroisocyanuric acid in an aqueous medium in a reaction zone maintained at a temperature in the range of about 15° C. to about 50° C., the rate of addition and of mixing said reactants being such as to maintain a pH in the range of 5.5 to 7.5, thereby forming an aqueous reaction mixture in said reaction zone having a pH in the said range comprising an aqueous slurry of the monohydrate of potassium dichloroisocyanurate, continuously removing a portion of said aqueous reaction mixture from said reaction zone, separating the solids from the bulk of the aqueous phase of the said removed aqueous reaction mixture, and dewatering the separated solids.

3. The process of making crystalline potassium dichloroisocyanurate having a monoclinic internal symmetry and a triclinic external symmetry which comprises bringing together and reacting potassium hydroxide and dichloroisocyanuric acid in an aqueous medium in a reaction zone maintained at a temperature in the range of about 20° C. to about 40° C., the rate of addition and of mixing said reactants being such as to maintain a pH in the range of from about 6.0 to about 7.0, thereby forming an aqueous reaction mixture in said reaction zone having a pH in the said range comprising an aqueous slurry of the monohydrate of potassium dichloroisocyanurate, continuously removing a portion of said aqueous reaction mixture from said reaction zone at a rate sufficient to maintain the volume of the reaction mixture in the reaction zone substantially constant, separating the solids from the bulk of the aqueous phase of the said removed aqueous reaction mixture, and dewatering the separated solids.

4. The process of making potassium dichloroisocyanurate which comprises continuously bringing together in an aqueous solution of potassium dichloroisocyanurate having a pH in the range of about 6.0 to about 7.0 maintained at a temperature in the range of about 0° C. to about 65° C. and reacting in a reaction zone (1) an aqueous solution of potassium hydroxide and (2) a mixture of dichloroisocyanuric acid and water containing from 50 to 85% by weight of the former and from 50 to 15% by weight of the latter, said (1) and (2) being at such a rate and with sufficient agitation to maintain a pH in the range of about 6.0 to about 7.0, thereby forming an aqueous reaction mixture in said reaction zone having a pH in the said range comprising an aqueous slurry of the solid reaction product of said reactants, continuously removing a portion of said aqueous reaction mixture from said reaction zone, separating the solids from the bulk of the aqueous phase of the said removed aqueous reaction mixture, and dewatering the separated solids.

5. The process of making crystalline potassium dichloroisocyanurate having a monoclinic internal symmetry and a triclinic external symmetry which comprises continuously bringing together in an aqueous solution of potassium dichloroisocyanurate having a pH in the range of about 6.0 to about 7.0 maintained at a temperature in the range of about 20° C. to about 40° C. and reacting in a reaction zone (1) an aqueous solution of potassium hydroxide and (2) a mixture of dichlorocyanuric acid and water containing 50 to 85% by weight of the former and 50 to 15% by weight of the later, said (1) and (2) being added at such a rate and with sufficient agitation to maintain a pH in the range of about 6.0 to about 7.0 thereby forming an aqueous reaction mixture in said reaction zone having a pH in the said range comprising an aqueous slurry of the monohydrate of potassium dichloroisocyanurate, continuously removing a portion of said aqueous reaction mixture from said reaction zone, separating the solids from the bulk of the aqueous phase of said removed aqueous reaction mixture, and dewatering the separated solids.

6. The process in accordance with claim 4 wherein the total solids in the reaction zone at any one time does not exceed 50% by weight.

7. The process in accordance with claim 5 wherein the total solids in the reaction zone at any one time does not exceed 50% by weight.

8. The process of making crystalline potassium dichloroisocyanurate having a monoclinic internal symmetry and a triclinic external symmetry which comprises bringing together and reacting potassium hydroxide and dichloroisocyanuric acid in an aqueous medium in a reaction zone maintained at a temperature in the range of about 0° C. to about 52° C., the rate of addition and of mixing said reactants being such as to maintain a pH in the range of from about 5.5 to about 7.5, thereby forming an aqueous reaction mixture in said reaction zone having a pH in said range comprising an aqueous slurry of the monohydrate of potassium dichloroisocyanurate; transferring a portion of said aqueous slurry from said reaction zone to a crystallizing zone, passing a supersaturated solution of potassium dichloroisocyanurate into said aqueous slurry in said zone at a temperature below 52° C. maintaining the resulting slurry in said zone at a temperature below 52° C., until coarser crystals of potassium dichloroisocyanurate are formed in the aqueous phase of said slurry in said zone, and thereafter removing and dewatering the coarser crystals so formed.

References Cited in the file of this patent

UNITED STATES PATENTS

| | | |
|---|---|---|
| 2,607,738 | Hardy et al. | Aug. 19, 1952 |
| 2,913,460 | Brown et al. | Nov. 17, 1959 |
| 2,969,360 | Westfall | Jan. 24, 1961 |

FOREIGN PATENTS

| | | |
|---|---|---|
| 1,149,758 | France | July 22, 1957 |

OTHER REFERENCES

Chattaway et al.: Journal of the Chemical Society, vol. 81, pages 200 to 202 (1902).

Hantzsch: Journal of the Chemical Society, vol. 90 (Part I), pages 146 to 148 (1906).